Patented Feb. 13, 1951

2,541,939

UNITED STATES PATENT OFFICE 2,541,939

PARA NITRO OR ACETYLAMINO SALICYLIC ACID CHLORIDES

Karl Gustaf Rosdahl and János Fekete, Malmö, Sweden, assignors to Aktiebolaget Ferrosan, Malmö, Sweden, a corporation of Sweden No Drawing. Application February 2, 1949, Serial No. 74,236. In Sweden February 19, 1948

6 Claims. (Cl. 260—544)

This invention refers to a method of producing salicylic acid chlorides, more particularly salicylic acid chlorides which have as a substituent in the paraposition a nitro, acylamino or other group containing a nitrogen atom bonded to the nucleus.

The object of the invention is to produce substituted salicylic acid chlorides which are valuable as intermediaries in the production of the corresponding substituted salicylic acid esters, particularly bacteriostatically active amino-salicylic acid esters.

According to the invention, a salt of the general formula

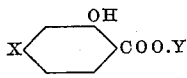

where X is a nitro, acyl amino or any other group which contains a nitrogen atom bonded to the nucleus and which is protected against attack by halogen but is convertible into an amino group, and where Y is an alkali metal, is treated by heating it with thionyl chloride, whereupon the salicylic acid chloride corresponding to the salicylic acid salt used is recovered as a reaction product from the mixture.

As an example of the realization of the method according to the invention, the production of 4-nitro-salicylic acid chloride will be described. 1 mol of 4-nitro-salicylate of sodium is gradually, during the course of 10 minutes and with strong agitation, mixed in with 40 mols of thionyl chloride which is heated to 70° C. A reaction takes place during which sulfur dioxide is developed. This is removed by means of a dry current of air. The agitation is continued for another 25 minutes at the same temperature. Then the excess thionyl chloride is distilled off in vacuum at 60° C. The residue is dissolved in a suitable solvent e. g. chloroform. The insoluble portions are filtered off, and the filtrate is evaporated to dryness in vacuum at not more than 60° C. The substance may be re-crystallized from benzene.

The 4-nitrosalicylic chloride thus obtained may thereupon be converted into 4-aminosalicyclic acid chloride by the utilization of known reactions for the conversion of nitro derivatives into amino derivatives.

The production of e. g. 4-acetyl amino-salicyclic acid chloride may be performed in a corresponding way by using the sodium salt of 4-acetyl amino-salicylic acid as starting material.

After the chlorination the acetyl group may be split off in a generally known way to leave 4-amino salicylic acid chloride.

What we claim and desire to secure by Letters Patent is:

1. A salicylic acid chloride which bears in the para-position to the COCl group a nitrogen-containing substituent selected from the group consisting of nitro and acetylamino.
2. Para-acetylamino salicylic acid chloride.
3. Para-nitro salicylic acid chloride.
4. A method for the preparation of a salicylic acid derivative which comprises heating with an excess of thionyl chloride an alkali metal salt of a salicylic acid which bears in the para-position to the carboxyl group a nitrogen-containing substituent selected from the group consisting of nitro and acylamino, thereafter distilling off any unreacted thionyl chloride, and isolating from the reaction mixture the formed salicylic acid chloride which is substituted in the para-position to the COCl group by the aforesaid substituent.
5. A method according to claim 4, wherein the substituent in the said para-position is acetylamino and wherein the distillation to remove the excess thionyl chloride is effected in vacuum at a temperature not exceeding 60° C.
6. A method according to claim 4, wherein the substituent in the said para-position is nitro and wherein the distillation to remove the excess thionyl chloride is effected in vacuum at a temperature not exceeding 60° C.

KARL GUSTAF ROSDAHL.
JÁNOS FEKETE.

REFERENCES CITED

The following references are of record in the file of this patent:

UNITED STATES PATENTS

| Number | Name | Date |
|---|---|---|
| 1,684,273 | Higgins | Sept. 11, 1928 |
| 1,951,364 | Kyrides | Mar. 20, 1934 |
| 2,288,334 | Vliet et al. | June 30, 1942 |
| 2,359,863 | Luich | Oct. 10, 1944 |
| 2,361,552 | Lichty | Oct. 31, 1944 |

FOREIGN PATENTS

| Number | Country | Date |
|---|---|---|
| 62,721 | Switzerland | Sept. 2, 1912 |
| 465,038 | Great Britain | Apr. 22, 1937 |